United States Patent [19]

Bremer et al.

[11] Patent Number: 4,528,751
[45] Date of Patent: Jul. 16, 1985

[54] EVISCERATING AND SURVIVAL TOOL

[76] Inventors: Howard W. Bremer, 1106 Broodwood Rd.; Winston O. Olson, 5806 Dorsett Dr., both of Madison, Wis. 53711

[21] Appl. No.: 631,500

[22] Filed: Jul. 16, 1984

Related U.S. Application Data

[63] Continuation-in-part of Ser. No. 293,154, Aug. 17, 1981, Pat. No. 4,461,080.

[51] Int. Cl.³ .............................................. B25B 11/00
[52] U.S. Cl. ........................................ 30/144; 7/161; 7/168; 17/66; 244/55.5
[58] Field of Search ...................... 30/123, 123.7, 144, 30/153, 161; 7/110, 113–115, 161, 168; 17/21, 23, 66, 69; 81/117 A, 177 E; 403/79, 319; 294/51, 55.5

[56] References Cited

U.S. PATENT DOCUMENTS

| | | | |
|---|---|---|---|
| 786,766 | 4/1903 | Hunt | 7/161 |
| 2,833,585 | 5/1958 | Nischan | 294/51 |
| 3,350,866 | 11/1967 | Spencer | 294/51 X |
| 3,627,007 | 12/1971 | Rieffer | 7/168 X |
| 4,114,216 | 9/1978 | Gatby | 7/148 X |

*Primary Examiner*—Douglas D. Watts

[57] ABSTRACT

An eviscerating and survival tool having a shaft with a handle at one end, a claw-like hook at the other end, the hook being comprised of at least two arcuately shaped tines defining a slot, and a saw blade disposed longitudinally along the portion of the shaft near the end containing said hook. In its preferred form the shaft is in two approximately equal portions connected by pivotable fastening means to permit the two parts of the shaft to be folded against each other with means to maintain the two parts in rigid end-to-end relationship in use.

1 Claim, 28 Drawing Figures

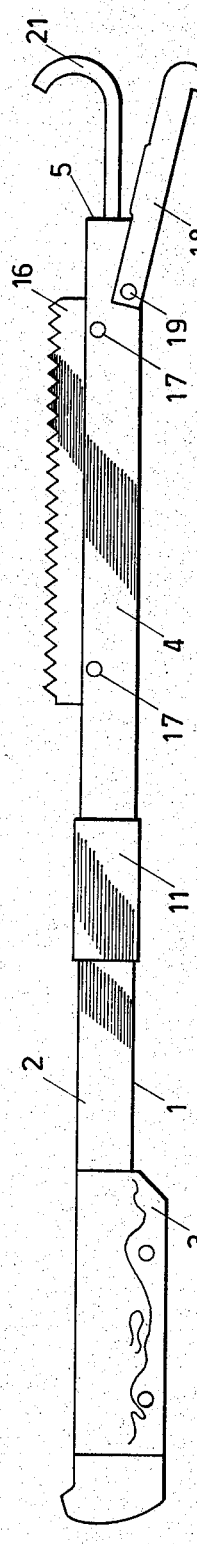
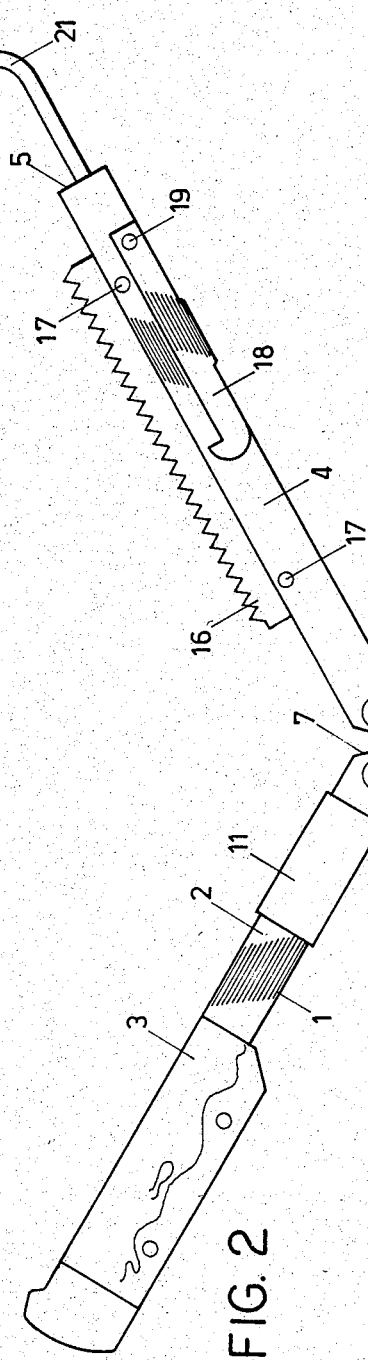
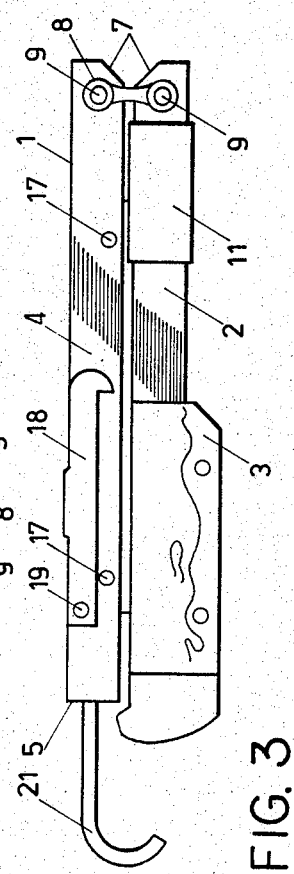
FIG. 1
FIG. 2
FIG. 3

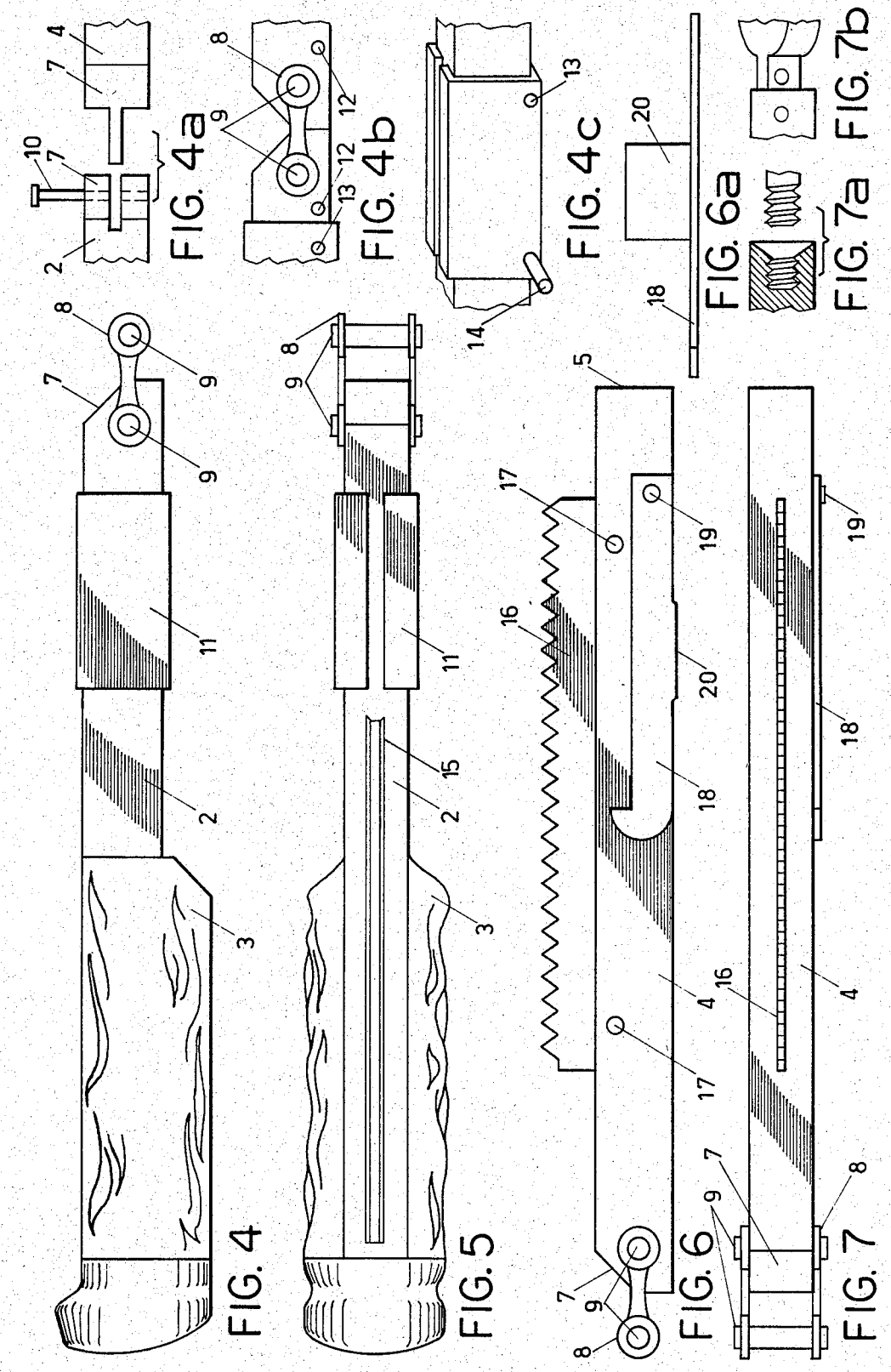

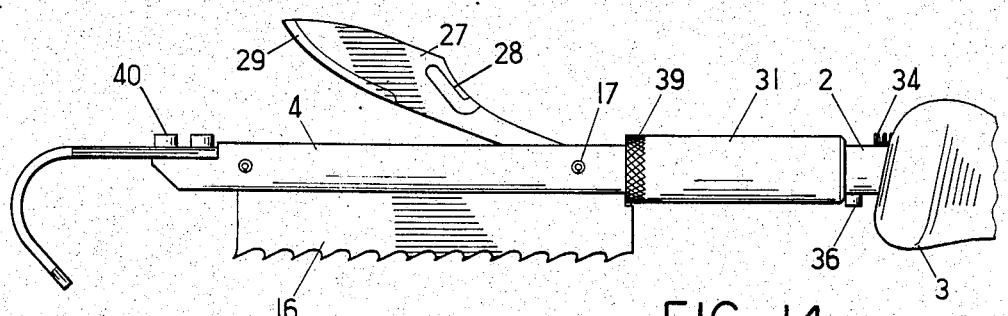
FIG. 14
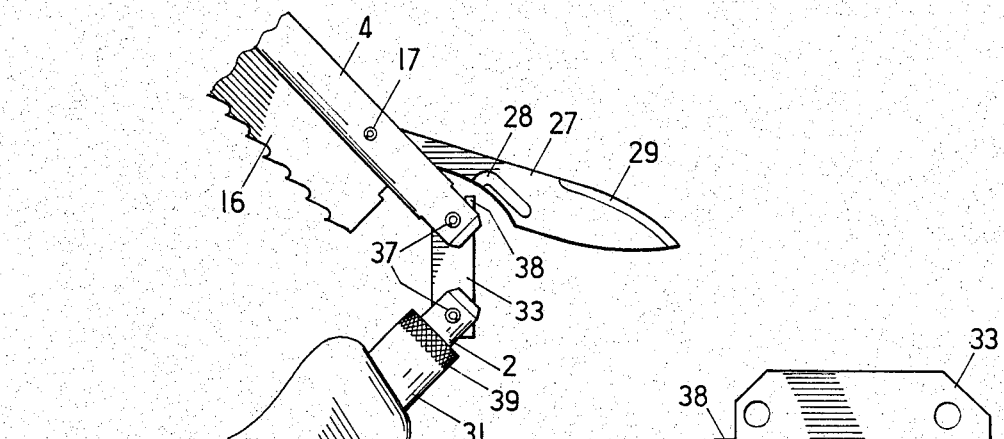
FIG. 15
FIG. 17a
FIG. 17b
FIG. 17c
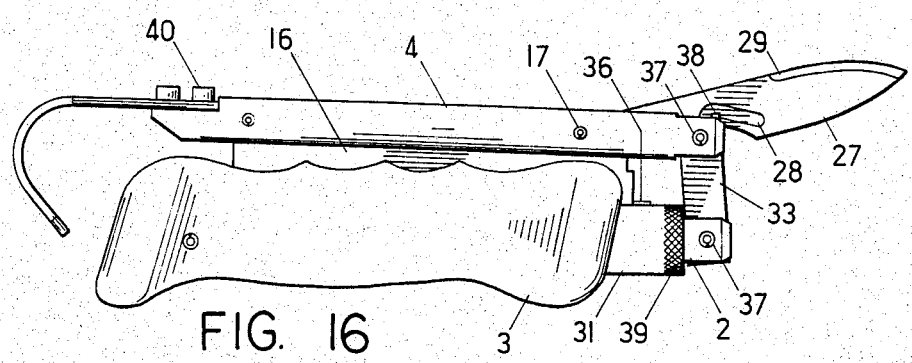
FIG. 16

EVISCERATING AND SURVIVAL TOOL

This application is a continuation-in-part of application Ser. No. 293,154, filed Aug. 17, 1981 now U.S. Pat. No. 4,461,080.

This invention relates to an eviscerating tool.

More particularly, this invention relates to a tool which can be used to eviscerate animals, fowl and fish and which also finds ready application as a survival tool.

The tool of this invention serves as an indispensable aid to the hunter and can be sized to accommodate either large or small animals, fowl and even fish.

Eviscerating a large animal in the field, e.g. deer, is considered by most to be an unpleasant and messy chore the inevitable result being that the person doing the eviscerating utilizing standard tools, e.g. a large knife, generally becomes well spattered with blood. The hands and arms are particularly vulnerable to becoming covered with blood since they must be inserted into the carcass to remove the entrails. In addition, in utilizing a knife only it is difficult to cleanly and completely remove all of the entrails since to accomplish that feat the pelvic bone must be split, a difficult task with a knife. Generally the knife is used to chop at the bone or, at times, a small hatchet is used for that purpose. The disadvantages attendant upon such procedure, in addition to the heavy work involved, is the possibility of puncturing or tearing the entrails and releasing their contents into the carcass, thereby contaminating the carcass.

The tool of the present invention overcomes these difficulties. It provides means by which all of the steps involved in eviscerating an animal can be carried out neatly and conveniently in the field and with a minimum probability of carcass contamination. Moreover in the foldable configuration shown in the accompanying drawings it can be easily and safely carried in the field although it should be understood that the tool can, as conveniently, be in non-foldable configuration.

In the accompanying drawings, reference to which, along with the following discussion, will promote a better understanding of the invention:

FIG. 1 shows the foldable eviscerating tool of this invention in its fully extended and locked position, with the optional slitting blade carried on the shaft in position for use.

FIG. 2 shows the foldable eviscerating tool of this invention in a partially folded position.

FIG. 3 shows said tool in completely closed or folded position.

FIG. 4 shows a side view of the handle portion of the foldable tool shown in FIGS. 1, 2 and 3.

FIG. 4a shows an alternative means for pivotably joining the handle and shank portions of the tool of this invention.

FIGS. 4b and 4c show alternative means for locking the pivoted joint between the handle portion and shank portion of the tool into a single rigid shaft.

FIG. 5 is a plan view of the handle portion of the tool shown in FIG. 4.

FIG. 6 is a side view of the shank portion of the foldable tool shown in FIGS. 1, 2 and 3 showing the optional pivotable slitting knife attached to the shank in closed position.

FIG. 6a is a plan view of the slitting knife shown in FIG. 6.

FIG. 7 is a plan view of the shank portion of the tool shown in FIG. 6.

FIGS. 7a and 7b show alternative means for fastening tool heads to the terminal end of the shank portion of the tool.

FIG. 14 shows the tool of FIG. 10 with the knife means in partially open position.

FIG. 15 shows the tool of FIG. 10 with shank portion in broken section and in partially folded relation to the handle portion and with the knife means extended to a locking position.

FIG. 16 shows the tool of FIG. 10 with the shank portion and handle portion in folded relationship and with the knife means in an extended and locked position.

FIGS. 17a, 17b and 17c show respectively, a side, plan and bottom view of the bar linking the shaft portion and handle portion of the foldable tool of this invention in pivotable relationship and carrying the detent for locking the knife means in open position.

Figure 8A:
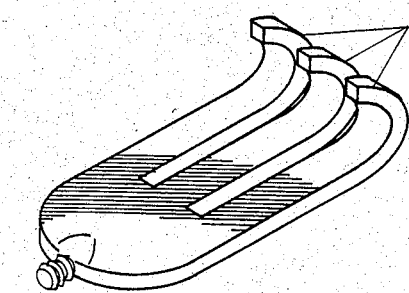
FIGS. 8a, 8b and 8c show different tool heads for fastening to the end of the tool shank.

In the drawings, in which like elements are designated by like numbers, 1 represents a foldable eviscerating tool of this invention. In such tool 2 represents the handle portion of the tool with appropriate contoured gripping aids, generally made of plastic, bone or other suitable substance, represented by 3. 4 designates the shank portion of the tool which at its terminal end 5, is drilled and tapped or has a recessed socket to receive various tool heads. Pivotable fastening means joins handle portion 1 with shank portion 4 to permit the two portions to be aligned in end-to-end relationship to comprise the extended shaft of tool 1. Both handle portion 2 and shank portion 4 have a chamfer 7 at their abutting ends to permit one portion to be rotated 180° about the fastening means and folded flat against the other portion.

Handle portion 2 and shank portion 4 are joined in foldable relationship by pivotable fastener 8 which can conveniently be a link from a standard bicycle chain. Such link is chosen so that its span between fastening pin 9 will be sufficiently great to permit handle portion 2 and shank portion 4 to be folded flat against each other as shown in FIG. 3. Other pivotable fastening means for the handle and shank portions, 2 and 4, of tool 1 will be readily apparent. For example, a tongue and groove configuration, as shown in FIG. 4a, permits the handle and shank to be readily held together by the insertion of pin 10, through pre-drilled holes in the tongue and the side elements defining the groove.

Figure 12:
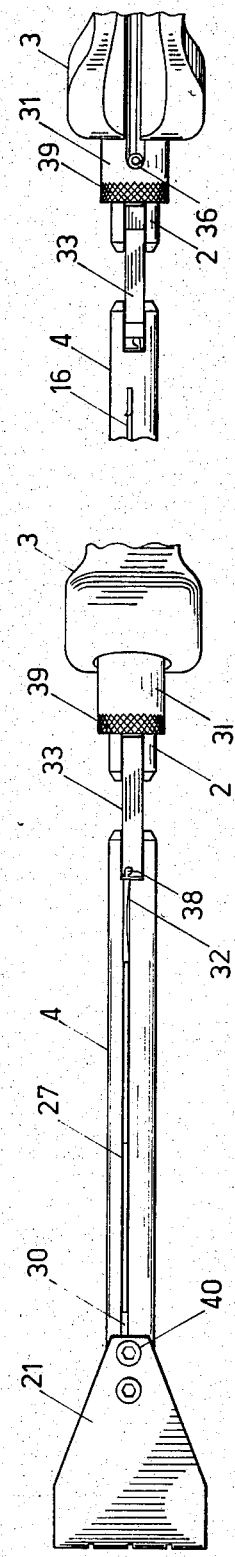
FIG. 12 shows a top view of the tool of FIG. 10 showing the knife means in closed position with the handle portion in broken section and sleeve 31 in retracted position.

To permit handle portion 2 and shank portion 4 to be held in end-to-end relationship so as to afford tool 1 with a rigid shaft during use slide 11, which is in wrap-around frictional engagement with handle portion 2 (or alternatively with shank portion 4 when so mounted) is slid over the pivotable fastening means between the handle and shank portions and held in place by frictional engagement or by other means as will be evident to those knowledgeable in the art. Thus, FIG. 4b shows one alternative means for keeping slide 11 in place over the foldable joint and FIG. 4c shows another such means. In FIG. 4a, 12 indicates a spring loaded pin set into shank portion 4, which is depressed while slide 11 is slid into position over the foldable joint and which then thru spring pressure engages in hole 13 in the slide when the hole and the pin become aligned. Spring loaded pins on both sides of shank portion will insure greater retentivity of the slide 11 over the joint and greater rigidity of the shaft of the tool.

Another method for retaining slide 11 in place is shown in FIG. 4c where pre-drilled holes in the slide 11 and the handle portion 2 and shank portion 4 are first aligned after which pin 14 is inserted into the aligned holes. The interior of slide 11 contains a horizontal channel to accommodate the protruding bicycle chain link fastener shown when it is slid into position. Obviously the chain link can be mounted so that its outside edges are flush with the sides of handle portion 2 and shank portion 4. Slide 11 and the described means for retaining it in position over the foldable joint are also fully applicable to the foldable joint configuration shown in FIG. 4a.

Other foldable joint configurations and means for holding such joint in a non-pivoting position will readily be apparent to those skilled in the art.

In FIG. 5, which is a plan view of the handle portion 2 shown in FIG. 4, 15 represents a slot into which saw blade 16 will fit when shank portion 4 is folded over onto handle portion 2 as shown in FIG. 3.

In FIG. 6, which represents the shank portion of the tool of this invention in side view, saw blade 16 is held in position by pins 17. Slitting knife 18, which can be optionally mounted on shank 4, is pivotably held in place on the shank by pin 19. A plan view of knife 18 is shown in FIG. 6a where portion 20 acts as a detent to prevent the knife from rotating about pin 19 when in the open position, as shown in FIG. 1, or in the closed position as shown in FIGS. 2, 3, 6 and 7. Slot 15 in the handle portion can be conveniently arranged to accommodate the point of slitting knife 18 when the tool is in the folded position shown in FIG. 3. Saw 16 and knife 18 are preferably held in place with drive pins so they can be readily replaced when necessary, although other fastening means are equally satisfactory.

FIGS. 7a and 7b show alternative means to fasten tool heads to the end 5 of shank portion 4. FIG. 7a depicts end 5 in a broken longitudinal section as drilled and tapped to accommodate a screw thread on the tool head, as shown in FIGS. 8a and 9. FIG. 7b shows a shaft and pin type of fastening with a tool head end as depicted in FIG. 8b.

Figure 8B:
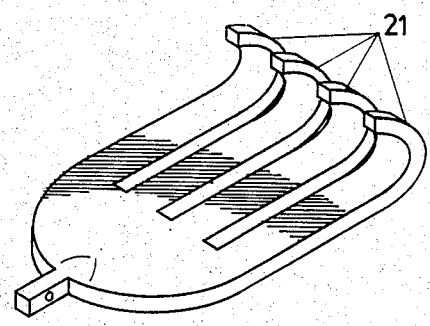
Figure 8C:
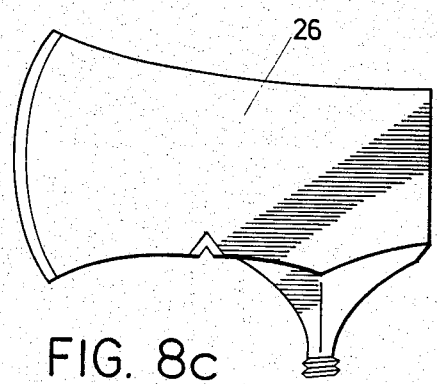
Figure 9A:
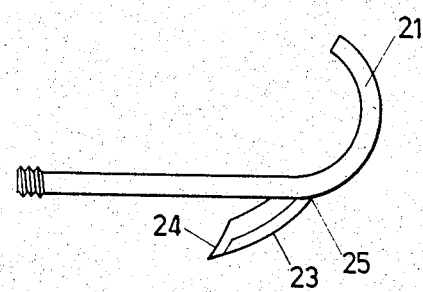
FIG. 9 shows the claw-like tool head of FIG. 8b with a foldable slitting knife pivotably mounted in the slot between the teeth of the claw in open position.
FIG. 9b shows a plan view of the pivotable slitting knife shown in FIG. 9.

FIGS. 8a, 8b and 8c shown different tool heads which can be used with the tool of this invention whether it is used as an eviscerating tool or a survival tool.

When used for eviscerating large game the number of arcuately arranged tines 21 in the claw-like tool head of FIGS. 8a and 8b should generally be greater in number than if the tool head is to be used for small game, fowl or fish. In any event the tines should define at least one slot between them. The edges and points of the curved tines 21 are blunted so that in the eviscerating process they will not puncture or cut the entrails.

The hatchet head 26 shown in FIG. 8c can be conveniently carried for attachment when its function may be needed, as for survival or other purpose. The saw blade obviously finds many purposes, as will be readily apparent.

Figure 9B:
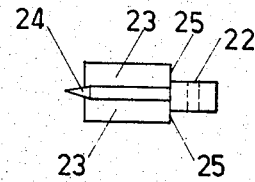

As an alternative to slitting knife 18, mounted on the shank portion of the tool, a slitting knife, as shown in FIG. 9b, can be pivotably fastened between two adjacent tines as shown in FIG. 9. The knife, shown in FIG. 9b would be positioned between two adjacent tines and pivotably held in place by a pin which would be inserted through drilled hole 22 while wings 23 on each side of the knife blade 24 act as a detent so that the knife will not swing through the slot. The wings 23 bear against adjacent tines while the back edges or shoulders 25 of the wings act as a detent against adjacent tines to prevent the knife from pivotably swinging too far open and to impart rigidity to the knife in use. The front end of wings 23 is wedge shaped to raise the skin of the animal slightly after it is slit by the point and front cutting edge of the knife blade to facilitate the slitting process.

As pointed out hereinbefore the tool of this invention can be in a foldable-shaft configuration as shown in the drawings or can have a non-foldable shaft. In the non-foldable configuration all elements heretofore described can be present except for the foldable joint in the approximate center of the shaft. In either form the tool can be readily carried in the field, preferably in a scabbard as a safety measure, although the foldable configuration obviously offers certain advantages because of its greater compactness in the folded mode.

FIGS. 10 through 17 show another configuration of the tool of this invention.

Figure 10:
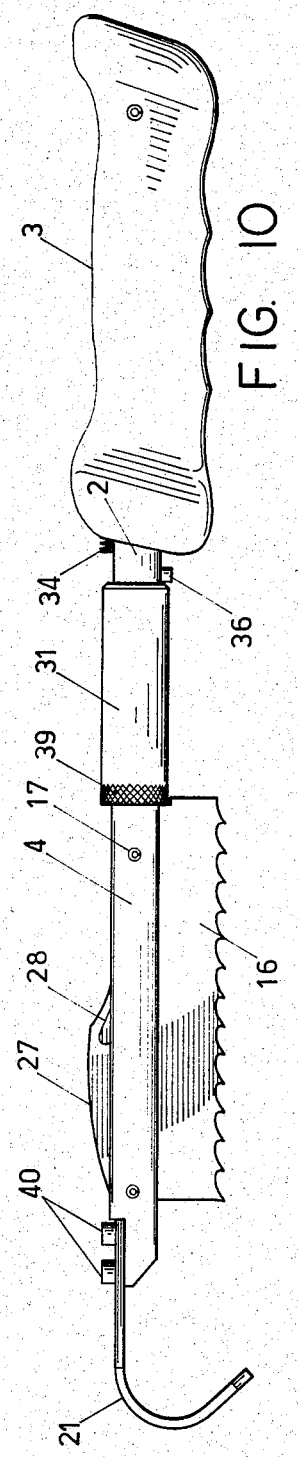
FIG. 10 shows another version of the foldable eviscerating tool of this invention, with pivotable knife means in closed position in the shank portion of said tool.
Figure 11:
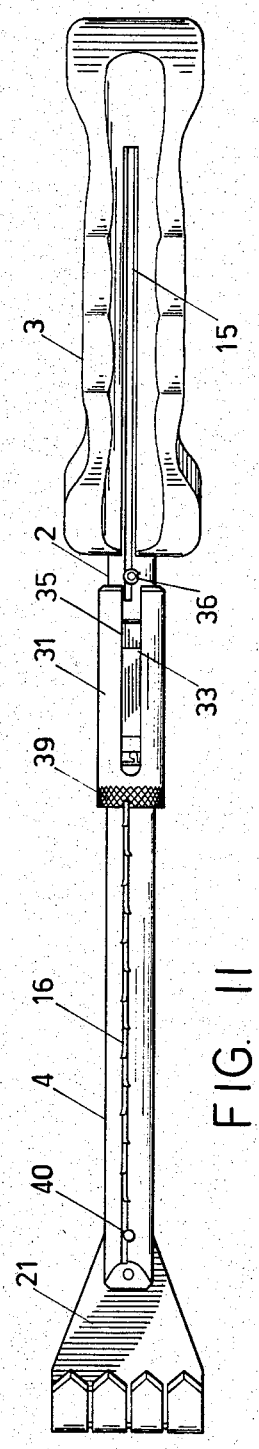
FIG. 11 shows a bottom view of the tool of FIG. 10.
Figure 13:
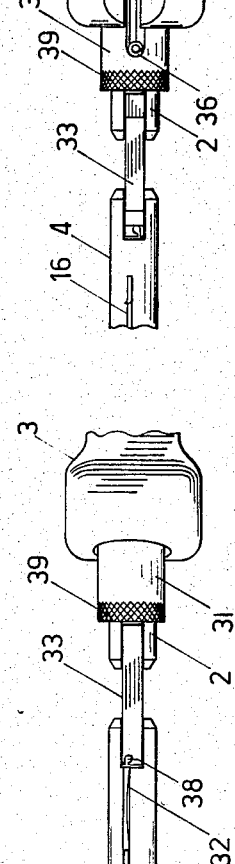
FIG. 13 shows a broken sectional bottom view of the foldable joint means with sleeve 31 in retracted position.

In the configuration depicted in those Figures, 27 refers to knife means the cutting edge of which, identified by 29, when the knife means is in closed position, fits into slot 30 in shank portion 4 as shown in FIGS. 10 and 12. Knife 27 which is pivotably mounted to shank 4 by pin 17, one of the pins holding saw blade 16 in place on the shank portion of the tool, is held in closed position in slot 30 by leaf spring means 32 shown in FIG. 12. 31 is a spring loaded sleeve, having knurled portion 39, which, when the foldable tool is unfolded from the position shown in FIG. 3 to a position where the handle portion 2 and the shank portion 4, along with the linking bar 33, are in end-to-end and in-line relationship, is propelled by spring 34 to a position over linking bar 33 to hold the handle portion and shank portions in rigid non-foldable position as shown in FIGS. 10, 11 and 14. If desired, spring 34 can be eliminated and the sleeve manually pulled over linking bar 33. Sleeve 31 can be rotated either clockwise or counterclockwise when in its farthest forward position so that slot 35 in the sleeve (shown in FIG. 11) no longer aligns with pin 36. This will permit the back end of sleeve 31 to abut against pin 36 and thereby lock the sleeve in position over the linking bar 33. It can be readily unlocked by again rotating it so that slot 35 and pin 36 are aligned permitting retraction of the sleeve back into handle 3 as shown in FIGS. 12, 13, 15 and 16. Retraction of the sleeve is necessary to place the tool in folded position either with the knife means exposed for use as shown in FIG. 16 or with the knife means in the closed position.

Bar linking means 33, shown in detail in FIGS. 17a through 17c, is utilized to fasten handle portion 2 and shank portion 4 together in foldable relationship as is shown in FIGS. 15 and 16. One end of bar 33 is fastened to shank portion 4 while the other end is fastened to handle portion 2 by pins 37. Bar 33 also carries knife detent means 38, which is made to engage L-shaped milled depression 28 on knife means 27 to hold the knife means in non-pivotable position for use as shown in FIG. 16.

To place knife means 27 in a non-pivotable and secure position for use, detent 38 must engage milled depression 28. This can be readily accomplished from either the folded position of the tool or when it is extended for use as shown in FIG. 14. Before beginning the procedure for securely anchoring knife means 27 in position for use it is preferable to have knife means 27 in closed position, that is, in slot 30 in shank portion 4 as shown in FIG. 12.

As an example, with the tool in the configuration shown in FIG. 14 but with the knife means in closed position, sleeve 31 is retracted into handle 3 so that linking bar 33 is exposed and the shank portion 4 and handle portion 2 are in the position shown in FIG. 15. In such position detent means 38 protrudes above shank portion 4 as shown. Knife means 27 is then pivoted clockwise about pin 17 until detent means 38 can be made to engage the shorter arm of the L-shaped milled depression 28 in the knife means. Shank portion 4 is then closed against handle portion 2 thereby permitting detent means 38 to slide into the longer arm of L-shaped depression 28 to engage the narrow shoulder between the milled depression and the back of the knife means as shown in FIG. 16. A hand can then be readily wrapped in gripping position around the shank portion 4 and handle 3, usually with the handle in the uppermost position to permit the cutting edge 29 of knife means 27 to be utilized with the application of downward pressure. In application, the foldable-shaft tool of this invention as shown in the drawings and being carried in the folded position shown in FIG. 3 is first unfolded so that the handle portion 2 and shank portion 4 are in end-to-end relation. Slide 11 or sleeve 31 is then slid over the pivotable connection to engage both the handle portion on one side of the connection and the shank portion on the other side of the connection, thereby providing the tool with a rigid shaft.

If the optional slitting knife 18 is present on the tool it is then moved from its closed position as shown in FIGS. 2 and 3, for example, to the open position shown in FIG. 1. The hooked blade of the knife is inserted through the skin of the belly of the animal, e.g. a deer, usually beginning toward the head end and drawn toward the tail to open the belly and expose the entrails. The slight hook on the end of the cutting blade once it has been inserted under the skin helps to lift the skin as the cut is being made thereby making the cutting process easier. After the appropriate cuts have been made as a safety precaution the knife is pivoted back in the closed position, i.e. as shown in FIGS. 2 and 3.

Alternatively, if the configuration of the tool shown in FIG. 10 is being used and the use of a cutting tool is necessary knife means 27 is placed in the extended and locked position shown in FIG. 16 as described above. Again, after the appropriate cuts have been made, the knife is returned to the closed position in slot 30 by reversing the described procedure, and placing the tool in the configuration shown in FIG. 10.

The tool is then inserted into the chest cavity to hook the lung lining or wind pipe with tines 21 whereupon the tool is twisted in the hand to firmly catch the lung lining, wind pipe, or other portions of the entrails in the slots between the tines which are then pulled by the tool toward the pelvic cavity. The tines are then released and the saw 16 is utilized to cut through the pelvic bone after which the entrails are again hooked by tines 21 and pulled completely from the animal. The interior of the carcass can then be further scraped with the claw-like tool head to more completely clean out the cavity.

Although claw means 21 is shown in the configuration of FIGS. 10 through 16 as being attached to the shank portion 4 by studs 40 it may be advantageous in some circumstances to mount claw 21 by means such as shown in FIGS. 7a or 7b so that it can be rotated out of the way to permit unimpeded use of the saw, or, conversely to permit the claw to be used for removing the entrails or for scraping absent any danger of the saw accidentally cutting into the entrails. Other configurations for mounting which will permit such rotation will be readily apparent to those skilled in the art, it also being apparent that the rotated claw should be held securely in the rotated position so that it will not accidentally rotate while being used for its purposes.

The same general procedure can be used in applying the tool of this invention to the evisceration of fowl and fish with the saw being utilized to cut off the heads and/or tails of fish and for descaling. Alternatively, the hatchet tool head 26 can be utilized to decapitate fowl and fish.

It should also be apparent that the tool of this invention will find many other uses, both for accomplishing domestic chores, such as in hand gardening to breaking soil, or, utilizing the saw blade 16 or hatchet tool head 26 for trimming bushes and small trees, or for similar functions, as well as the prime function of eviscerating animals, fowl and fish, in practicing survival techniques.

What is claimed is:

1. An eviscerating and survival tool comprising a shaft having a handle at one end and a claw-like hook at the other end, said claw-like hook containing at least two arcuately shaped tines defining at least one slot therebetween, said tines embracing about 180° of arc and being characterized by blunted edges and points, said shaft being divided into a handle portion and a slotted shank portion of approximately equal lengths with said handle portion and shank portion being connected by pivotable fastening means to permit said handle portion and said shank portion to fold against each other and means for securing said handle portion and shank portion in end-to-end foldable relationship to provide a rigid shaft, a saw blade demountably attached lengthwise to said slotted shank portion, knife means pivotably mounted within the slot in said shank portion at the end of the shank portion opposite said claw-like hook, whereby it can be pivoted from a storage position within said slot into an open position, said pivotable fastening means carrying detent means to engage and lock said knife means in its open position.

* * * * *

UNITED STATES PATENT OFFICE
CERTIFICATE OF CORRECTION

Patent No. 4,528,751  Dated July 16, 1985

Inventor(s) Winston O. Olson

It is certified that error appears in the above-identified patent and that said Letters Patent are hereby corrected as shown below:

On the title page;
The sole inventor is Winston O. Olson.

Signed and Sealed this

First Day of October 1985

[SEAL]

Attest:

Attesting Officer

DONALD J. QUIGG

Commissioner of Patents and
Trademarks—Designate